Dec. 19, 1961     E. ZILLMER     3,013,353
PROJECTION WITH A MAGAZINE FOR INDIVIDUAL PICTURES

Filed March 15, 1960     3 Sheets-Sheet 1

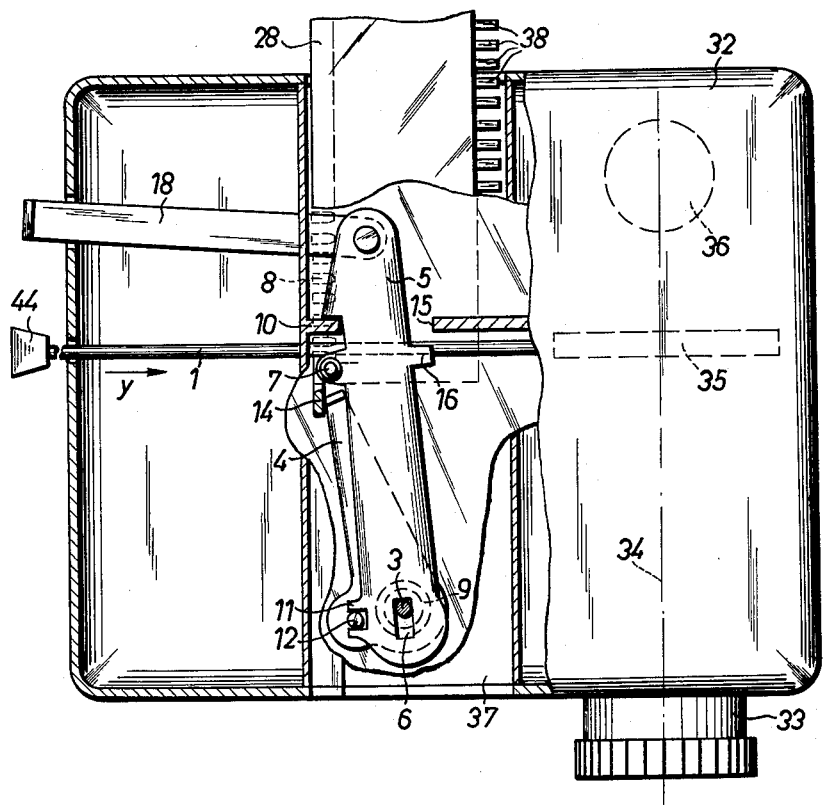

Dec. 19, 1961  E. ZILLMER  3,013,353
PROJECTION WITH A MAGAZINE FOR INDIVIDUAL PICTURES
Filed March 15, 1960  3 Sheets-Sheet 3

United States Patent Office 3,013,353
Patented Dec. 19, 1961

3,013,353
PROJECTION WITH A MAGAZINE FOR
INDIVIDUAL PICTURES
Erich Zillmer, Braunschweig, Germany, assignor to Voigtlander A.G., Braunschweig, Germany, a corporation of Germany
Filed Mar. 15, 1960, Ser. No. 15,187
Claims priority, application Germany Mar. 28, 1959
8 Claims. (Cl. 40—79)

This invention relates to slide or picture projectors of the type having a longitudinally movable multiple-slide magazine arranged to hold a plurality of slides, a slide changer operable to move one slide at a time out of the magazine into alignment with the projection axis and to return the slide to the magazine, and means operable responsive to each cycle of operation, the slide changer to advance the magazine by the distance between adjacent slides. More particularly, the invention relates to improved mechanisms for so advancing the magazine.

In slide projectors of this type, the slide changer has an element which enters the magazine to engage an individual picture therein and displace it from the magazine to a position in alignment with the projection axis. The slide changer may then be operated in the reverse direction to return the slide to the magazine, and it is during this reverse movement of the slide changer that the mechanism for advancing the magazine is operated. Obviously, the magazine cannot be advanced until such time as the slide element is disengaged completely from the magazine. Consequently, there is a very small amplitude of motion of the slide changer available for effecting advance of the magazine. Due to such short range of available movement of the slide changer to effect operation of the magazine, a great deal of force has hitherto been considered necessary to advance the magazine. The degree of force required is such that frequently the projector is displaced from its support or, at the least, moved out of proper alignment with the screen.

In accordance with the present invention, a simple mechanism for advancing the magazine responsive to each of operation of the slide changer is provided, which is inexpensive and requires only a relatively small amount of force for operation.

More particularly, in one embodiment of the invention, a crank is pivotally mounted about an axis spaced substantially from the plane of movement from the slide changer and in the path of movement of the magazine. This crank has one relatively long arm which is engageable by projections on the slide changer so that the crank is rocked during movement of the slide changer in either direction.

A relatively elongated control lever is provided with a relatively short longitudinally extending slot which receives the pivot of this crank, and this control lever has a tooth or the like for engaging a rack surface on the magazine. The control lever is both pivotal about the axis of the crank arm and movable longitudinally of itself.

The control lever has, projecting from one side thereof, a pair of spaced arms forming a fork which receives a pin on a relatively short arm of the crank. Means are provided for releasably constraining the lever to move with the crank, so that, as the crank is moved in one direction by operation of the slide changer in returning a slide to the magazine, it pivots the control lever in the same direction until abutment means limit further rotational movement of the control lever. At this time, the slide changer element will have completely disengaged the magazine, but there is still a further short movement of the slide changer. This further short movement of the slide changer, as transmitted through rotation of the crank, causes a short longitudinal movement of the control lever which advances the magazine by the gauge of one slide, after which the control lever engages an abutment which limits further movement longitudinally of the control lever.

Upon movement of the slide changer in the direction to remove a slide from the magazine, in the initial part of such movement, the crank swings the control lever to a limiting position in which the tooth is disengaged from the rack and then moves the control lever longitudinally in the reverse direction until further movement of the control lever is prevented by abutment means. The device is then ready for the next operation of advancing the magazine.

In an alternative embodiment of the invention, the slide changer has secured to extend parallel therewith and laterally off-set therefrom a spring arm which is vertically deflectable, this spring arm being secured at its inner end to the slide changer and extending through a side wall of the casing. A relatively short control lever is pivotally mounted, on a vertical axis, on this spring member and is spring biased against a stop thereon so as to extend parallel to the direction of movement of the magazine. This control lever carries a first pin on its upper surface which, when the slide changer is moved in a direction to restore a slide to the magazine, enters between the teeth of a rack on the magazine. Coaxial with this pin is a second downwardly extending pin which, at this position of the slide changer, engages an abutment extending parallel to the direction of movement of the magazine. Also, at this position, the slide changer element will have been disengaged from the magazine and, upon further movement of the slide changer, the control lever will pivot about its pivotal connection to the spring arm thus causing a movement of its upper pin, engaged in the magazine rack, in a direction longitudinally of the magazine to advance the latter by the gauge of one slide. Upon return movement of the slide changer to move a new slide out of the magazine, the pin on the control lever is first disengaged from the rack on the magazine and then the control lever is spring biased back to its position extending longitudinally of the direction of movement of the magazine.

In both embodiments of the invention, means other than the slide changer are provided for operating the magazine advancing mechanism without necessarily operating the magazine slide changer. In the first mentioned embodiment, this means comprises a lever pivoted to the free end of the control lever and extending through a slot in a side wall of the casing. In the second embodiment, this means comprises the free end of the spring arm extending through the slot in the side wall of the casing, and this free end may be deflected downwardly to disengage the pin from the magazine rack so that the magazine may be pushed forward by hand.

For an understanding of the principles of the invention, reference is made to the following description of typical embodiments thereof as illustrated in the accompanying drawings.

In the drawings:

FIG. 2 is a view similar to FIG. 1, but with the component parts illustrated during an advance of the magazine;

FIG. 3 is a sectional view taken along the line III—III of FIG. 1;

Figure 1:
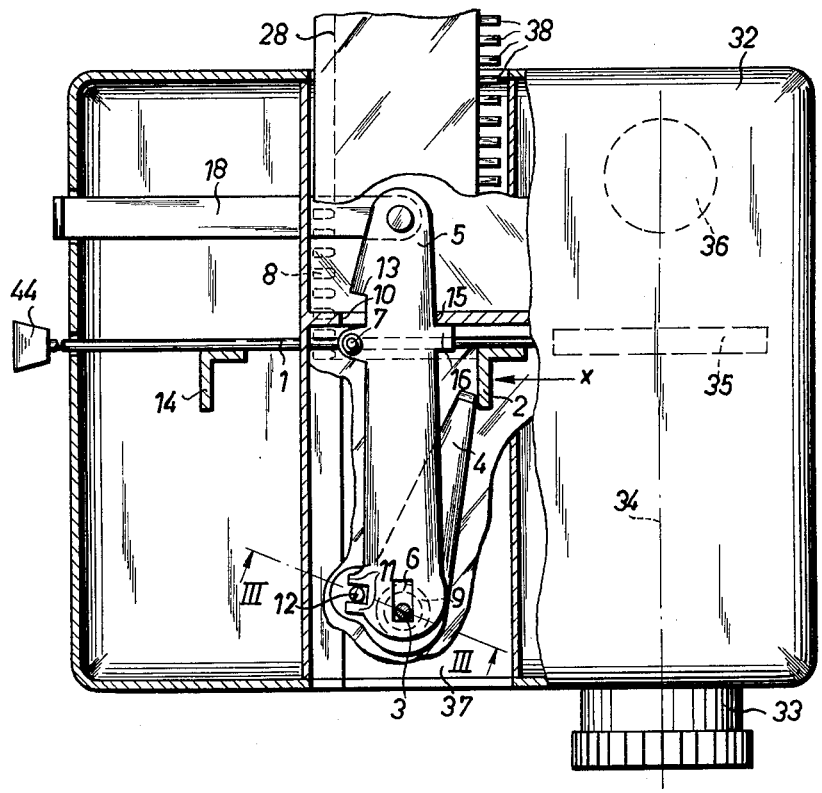
FIG. 1 is a top plan view, partially broken away, of a projector incorporating one embodiment of the invention mechanism, the mechanism and the associated parts being shown in the position occupied just before advance of the magazine.

Referring to the embodiment of the invention illustrated in FIGS. 1, 2, and 3, a projector casing 32 is illustrated as having an objective 33 with an optical axis 34 extending through a picture stage 35 and a projection lamp 36. Casing 32 is provided with a channel 37 extending in parallel off-set relation to optical axis 34 and receiving a multiple slide magazine 28 in which are mounted slides 38, magazine 28 being open, in a conventional manner, in the direction toward the picture stage 35. The bottom wall of magazine 28 is formed with a rack 8. Rack 8 is one of the elements for moving the magazine, in a step by step fashion, to move successive slides 38 into the plane of movement of slide changer 1.

Figure 4:
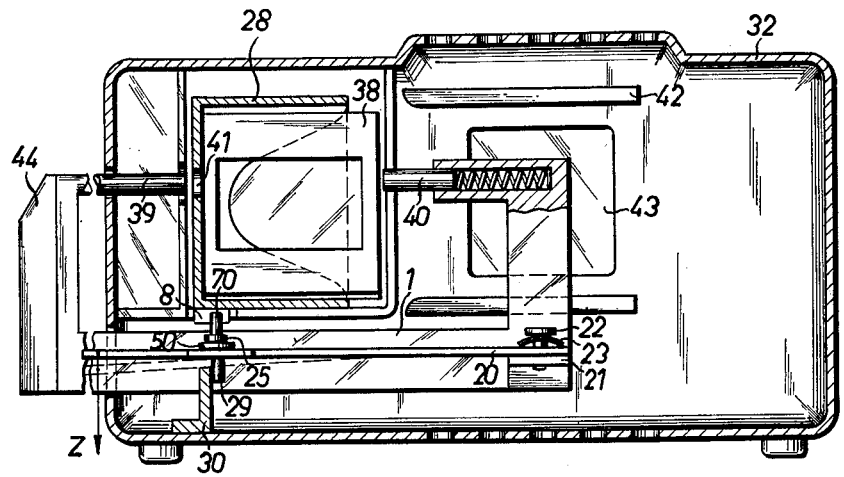
FIG. 4 is a vertical sectional view through a projector incorporating the other embodiment of the invention mechanism, the plane of the section being substantially coincident with the "picture" plane of the projector.
Figure 5:
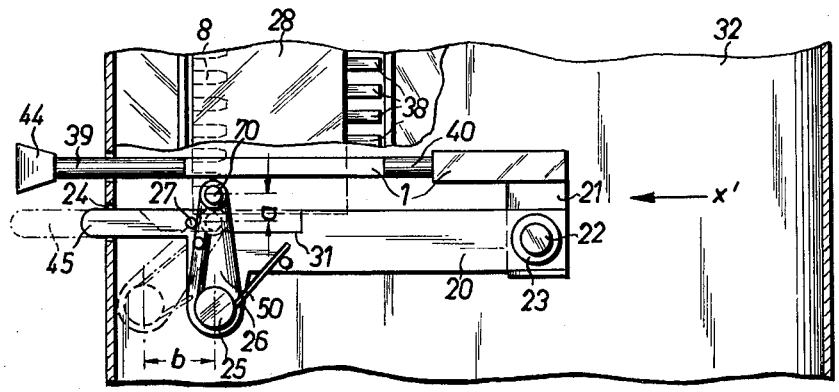
FIG. 5 is a partial horizontal sectional view illustrating the magazine advancing elements of the embodiment of the mechanism shown in FIG. 4.

Referring momentarily to FIGS. 4 and 5, slide changer 1 is provided with a pair of aligned arms 39 and 40. When slide changer 1 is moved to the right, as viewed in FIG. 4, arm 39 enters through an aperture 41 in magazine 28 to engage a slide 38 and move the latter onto guide rails 42 above and below the image aperture 43 of the picture plane 35. Upon return movement of slide 1, arm 40 of the latter moves slide 38 back into magazine 28. Slide changer 1 has an opening handle 44 for facilitating its operation.

Referring again to FIGS. 1 and 2, the mechanism for advancing magazine 28 is mounted below the plane of movement of the magazine. FIG. 1 illustrates the parts of this mechanism in a position which they occupy when the return movement of a slide 38 from picture stage 35 to magazine 28 has been partially completed to the extent that arm element 39 of slide changer 1 has just started to leave the opening 41 of magazine 28. Upon further movement of slide changer 1 in the direction of the arrow $x$ in FIG. 1, a stop 2 on the slide changer abuts against the free end of a relatively long arm 4 of a crank pivoted on an axis 3. A control lever 5 is pivotally and slidably mounted on the axis 3, this control lever overlying the crank and being held thereagainst by a spring 9. Spring 9 produces frictional engagement between control lever 5 and the crank.

Control lever 5 has a slot 6 extending longitudinally thereof and embracing the pivot or axial 3. This control lever also has two short arms which form a fork 11 receiving a pin 12 on a shorter arm of the crank having the longer arm 4. Upon continued movement of slide changer 1 to the left, as viewed in FIG. 1, stop 2 causes the crank arm 4 to move counter-clockwise and, through pin 12, fork 11, and the constraining means shown in FIG. 3, control lever 5 is also moved counter-clockwise. This swinging movement of the control lever 5 moves a tooth 7 thereon into engagement with the teeth of rack 8 of magazine 28. At this time, further rotation of control lever 5 is prevented by means of its abutting against a stationary stop 10 in a wall of the channel 37. As control lever 5 engages this stationary stop, arm 39 of slide changer 1 (FIG. 4) will have moved completely out of opening 41 in the magazine 28.

As control lever 5 can no longer swing, the further movement of crank arm 4 by slide changer 1, through the pin 12 and fork 11, will result in longitudinal movement of lever 5, this movement being accommodated by the short longitudinal slot 6. The longitudinal movement of slide 5 carries the magazine 28 in a direction to move a succeeding slide 38 into alignment with the slide changer 1. The movement stops when projection 13 of lever 5 engages stop 10, and the parts now occupy the position shown in FIG. 2.

When slide changer 1 is moved in the direction of the arrow $y$ of FIG. 2 to move a slide 38 out of magazine 28 and into the picture plane, a stop 14 on slide changer 1 abuts the crank arm 4 to swing the latter clockwise. During such swinging movement, the control lever 5 will be swung clockwise due to engagement of pin 12 in the fork 11, but such swinging movement of lever 5 is terminated when tooth 7 disengages control rack 8, due to abutment of lever 5 against stop 15. Further rotary movement of crank arm 4, through the medium of pin 12 and fork 11, then moves lever 5 longitudinally until a stop 16 therein engages the stop 15, and the parts now occupy the position shown in FIG. 1.

When arm 39 is disengaged from magazine 28, tooth 7 is engaged in control rack 8, so that inadvertent displacement of magazine 28 along channel 37 is thereby prevented. However, in order to provide for such displacement, as for projecting a particular slide 28, a handle 18 is pivoted to the free end of lever 5 and extends through a slot in the side of the casing 32. By means of this handle, lever 5 may be swung so that tooth 7 will disengage rack 8, crank arm 4 being also swung, and the slide 28 may then be advanced along channel 37 to the desired position. While handle 18 is shown as pivotally connected to lever 5, it should be understood that the lever may be associated with the handle in any desired manner and need not necessarily be pivotally connected thereto.

Referring now more particularly to the embodiment of the invention shown in FIGS. 4 and 5, the stops 2 and 14 are omitted from slide changer 1 and the latter is provided with a right angle extension 21, at its right end as viewed in FIGS. 4 and 5, to which is secured a substantially flat spring arm 20 which is vertically deflectable. Arm 20 has a reduced free end 45 which extends through a slot 24 in a side wall of casing 32. The other end of arm 20 is secured to the angle extension 21 by a pin 22 with which is associated a cup-shaped spring 23.

Spring 20 is formed with an off-set which carries a pivot 25 for a control lever 50. A spring 26 biases or urges conrtol lever 50 into engagement with a pin 27 on the bar 20. When, and as is shown in FIGS. 4 and 5, the picture changing slide 1, moving in a direction to replace a slide 38 in the magazine 28, has reached a position in which its arm 39 has disengaged the magazine 28, a tooth 70 on the free end of lever 50 will be engaged in the rack 8 on the magazine 28. Also at this position, a pin 29 which is substantially coaxial with the pin-shape tooth 70, and which extends downwardly from the lever 50, will engage a stationary ledge 30 extending perpendicular to the direction of movement of slide changer 1 and longitudinally of the direction of movement of magazine 28. Upon further movement of slide changer 1 in the direction of arrow $x'$ of FIG. 5, the pin 29 slides along the ledge 30 so that lever 50 swings clockwise about the pivot 25 as indicated in dotted lines in FIG. 5.

Thus, while slide changer 1 moves by the distance $b$, as shown in FIG. 5, pin 29 and thus tooth 70 and magazine 28 are displaced by the distance $a$. This distance corresponds to the gauge or distance between adjacent slides 38 in magazine 28. Further movement is limited by pin 29 abutting the inner edge of a recess 31 in the bar 20.

Upon return movement of slide changer 1 to displace the succeeding slide out of magazine 28, tooth 70 first disengages the control rack 8 and then lever 50 is biased by the spring 26 back to the position shown in FIG. 5. The transmission ratio between the slide movement and the switching motion of the magazine is determined by the effective length of lever 50. Thus, the distance between the axis of pin 70 and the axis of pivot 25 must be properly selected in proportion to the desired range of movement, indicated at $b$, of the magazine during each advancing step.

The means for providing for manual displacement of slide 28, in the embodiment shown in FIG. 4, comprises the free end of spring bar 20, which can be bent downward in the direction of the arrow $z$ of FIG. 4 so as to disengage tooth or pin 70 from control rack 8. Thus, the magazine 28 may be displaced as desired after such disengagement.

While specific embodiments of the invention have been shown and described in detail to illustrate the application of the principles of the invention, it will be understood that the invention may be embodied otherwise without departing from such principles.

What is claimed is:

1. In a slide projector of the type including a casing, a multiple slide magazine longitudinally displaceable in said casing, and a slide changer movable at right angles to the direction of movement of said magazine to displace a slide therefrom and position it for projection and to return the slide to the magazine, the slide changer having an element engaging in the magazine during such slide displacement: mechanism for advancing the magazine, by the distance between successive slides, responsive to each cycle of operation of the slide changer; said mechanism comprising, in combination, rack means extending along the magazine; a component movable by the slide changer; a control lever pivotally associated with said component and movable therewith, and normally extending longitudinally of the direction of movement of the magazine; a pin on the free end of the lever engageable and disengageable relative to said rack; means releasably constraining said lever against movement relative to said component in a position laterally aligning said pin with said rack; said slide changer, during movement in the slide returning direction, moving said lever bodily through said component, in the direction of movement of said slide changer to engage said pin in said rack; and abutment means effective, as the said slide changer element disengages the magazine, to obstruct further movement of the free end of the lever by said component; said component and said abutment means, during continuation of such slide changer movement, conjointly effecting movement of said lever relative to said component in a direction to move said pin longitudinally of the direction of movement of said magazine to advance said magazine to align a succeeding slide with the slide changer.

2. Mechanism as claimed in claim 1 including means, cooperable with said abutment means, to limit advance of said magazine to a pre-set distance.

3. Mechanism as claimed in claim 1 including a fixed pivot in said casing; said control lever having a longitudinally extending slot engaging said pivot; said component comprising a crank pivotal about said pivot and having an arm movable by said slide changer and a second arm carrying a pin radially spaced from said pivot and engaged in a slot on said lever; said abutment means comprising a stop on said casing and a surface extending longitudinally of said lever; said lever surface moving along said stop parallel to the direction of movement of said magazine during advance of said magazine.

4. Mechanism as claimed in claim 3 in which said constraining means maintains said lever and said crank in frictional surface to surface engagement with each other.

5. Mechanism as claimed in claim 1 including a manual operating handle projecting from the casing and secured to said lever adjacent the free end of the latter; said handle being effective to move said lever relative to said component to disengage said tooth from the rack on the magazine so that the latter may be manually advanced to any selected position.

6. Mechanism as claimed in claim 1 in which said control lever is pivoted to said component; a pin on said component; said constraining means comprising a spring engaged between said lever and said component and biasing said lever to engage said pin on said component.

7. Mechanism as claimed in claim 6 in which said component comprises a flat spring bar secured to and extending substantially parallel to said slide changer; said abutment means including a stop fixed to the casing and extending parallel to the direction of movement of the magazine, and a stop pin on the free end of said lever coaxial with the rack engaging pin thereon; said stop pin engaging said stop when said slide changer element has disengaged the magazine, and effecting pivoting of said lever about its pivotal connection to said flat bar and against the force of said spring upon further movement of said slide changer; whereby said stop pin will move longitudinally along said fixed stop to advance the magazine.

8. Mechanism as claimed in claim 7 in which said flat bar extends outwardly through a slot in a wall of said casing for manual deflection of said flat bar to disengage said rack engaging pin from such rack so that said magazine may be manually advanced to any selected position.

References Cited in the file of this patent

UNITED STATES PATENTS

| | | |
|---|---|---|
| 2,756,630 | Goldberg | July 31, 1956 |
| 2,837,851 | Wiklund | June 10, 1958 |
| 2,907,128 | Norton | Oct. 6, 1959 |
| 2,915,840 | Wiklund | Dec. 8, 1959 |